United States Patent
Gill et al.

(10) Patent No.: US 9,709,111 B1
(45) Date of Patent: Jul. 18, 2017

(54) ROTATIONAL COUPLING DEVICE WITH NON-CONTACT ANTI-ROTATION MECHANISM

(71) Applicant: Warner Electric Technology LLC, Braintree, MA (US)

(72) Inventors: George P. Gill, Caledonia, IL (US); Brian K. Holmbeck, Sharon, WI (US); Michael Humy, Roscoe, IL (US)

(73) Assignee: Warner Electric Technology LLC, Braintree, MA (US)

(*) Notice: Subject to any disclaimer, the term of this patent is extended or adjusted under 35 U.S.C. 154(b) by 0 days.

(21) Appl. No.: 15/163,733

(22) Filed: May 25, 2016

(51) Int. Cl.
  *F16D 65/16* (2006.01)
  *F16D 121/20* (2012.01)
(52) U.S. Cl.
  CPC .......... *F16D 65/16* (2013.01); *F16D 2121/20* (2013.01)
(58) Field of Classification Search
  CPC ............................ F16D 65/16; F16D 2121/20
  See application file for complete search history.

(56) References Cited

U.S. PATENT DOCUMENTS

| | | | |
|---|---|---|---|
| 2,612,248 A | 9/1952 | Feiertag | |
| 5,119,918 A | 6/1992 | Pardee | |
| 5,285,882 A | 2/1994 | Pardee | |
| 5,465,815 A | 11/1995 | Ikegami | |
| 5,971,121 A | 10/1999 | Pardee | |
| 6,220,403 B1* | 4/2001 | Kobayashi | H02K 49/043 188/158 |
| 6,659,237 B1* | 12/2003 | Pribonic | B60L 7/28 108/180 |
| 7,975,818 B2* | 7/2011 | Pardee | F16D 27/004 192/18 B |

(Continued)

FOREIGN PATENT DOCUMENTS

EP    0953784 A2    11/1999

OTHER PUBLICATIONS

International Search Report issued in corresponding International (PCT) Patent Application No. PCT/US2017/015708 (Apr. 18, 2017).

(Continued)

*Primary Examiner* — David J Hlavka
(74) *Attorney, Agent, or Firm* — Reising Ethington P.C.

(57) ABSTRACT

A rotational coupling includes a coupling disc configured to be disposed about a shaft having a rotational axis. An electromagnet assembly on one side of the coupling disc includes a housing and a conductor within the housing. An armature is disposed on an opposite side of the coupling disc opposite the conductor and the coupling disc, electromagnet assembly and armature form an electromagnetic circuit when current is supplied to the conductor to urge the armature towards engagement with the coupling disc. An anti-rotation mechanism for the electromagnet assembly includes one or more coupling permanent magnets and one or more fixed permanent magnets configured to be mounted to an outer surface of the housing of the electromagnet assembly and a fixed support structure, respectively. The coupling and fixed permanent magnets are arranged to inhibit movement of the coupling permanent magnets and electromagnet assembly in either rotational direction about the rotational axis.

20 Claims, 5 Drawing Sheets

(56) References Cited

U.S. PATENT DOCUMENTS

| | | | | |
|---|---|---|---|---|
| 8,499,916 B2* | 8/2013 | Pardee | ................. | F16D 27/112 |
| | | | | 192/18 B |
| 8,851,235 B2* | 10/2014 | Allington | ................. | A62B 1/08 |
| | | | | 182/234 |
| 9,109,642 B2* | 8/2015 | Kitayama | ............... | F16D 28/00 |
| 2006/0278480 A1* | 12/2006 | Pardee | ................. | F16D 27/112 |
| | | | | 188/218 XL |
| 2007/0227853 A1 | 10/2007 | Pardee | | |
| 2009/0314600 A1 | 12/2009 | Kato et al. | | |
| 2015/0001023 A1 | 1/2015 | Kimes et al. | | |

OTHER PUBLICATIONS

Written Opinion issued in corresponding International (PCT) Patent Application No. PCT/US2017/015708 (Apr. 18, 2017).

* cited by examiner

ROTATIONAL COUPLING DEVICE WITH NON-CONTACT ANTI-ROTATION MECHANISM

BACKGROUND OF THE INVENTION a. Field of the Invention

This disclosure relates to a rotational coupling device for a power transmission assembly. In particular, the disclosure relates to a rotational coupling device having an electromagnet assembly for use in coupling, uncoupling or braking members of the power transmission assembly and in which the electromagnet assembly is held against rotation without requiring mechanical contact between the electromagnet assembly and surrounding structure.

b. Background Art

Rotational coupling devices such as clutches and brakes are used to control transfer of torque between two bodies. In an electromagnetic coupling device, an armature coupled to an input or output member is brought into engagement with, and/or disengagement from, a coupling disc coupled to the other of the input or output members in order to rotatably couple or decouple the input and output members and/or brake one of the members.

In conventional electromagnetic coupling devices, the electromagnet assembly used to establish an electromagnetic circuit between the armature and coupling disc is fixed against rotation by mechanically coupling the housing for the electromagnet assembly to a nearby structure. This mechanical coupling has several disadvantages, however, that arise as a result of engagement between the electromagnet assembly and structure when the mechanical coupling attempts to resist rotation of the electromagnet assembly during operation of the rotational coupling device. First, the engagement between the electromagnet assembly and structure creates undesirable levels of noise. Second, the engagement creates significant mechanical stress and wear on components of the rotational coupling device and the structure.

The inventors herein have recognized a need for a rotational coupling device that will minimize and/or eliminate one or more of the above-identified deficiencies.

BRIEF SUMMARY OF THE INVENTION

This disclosure relates to a rotational coupling device in which an electromagnet assembly of the device is held against rotation without requiring mechanical contact between the electromagnet assembly and surrounding structure.

A rotational coupling device in accordance with one embodiment of the present teachings includes a coupling disc configured to be disposed about a shaft having a rotational axis. The device further includes an electromagnet assembly disposed on a first side of the coupling disc. The assembly includes a housing and a conductor disposed within the housing. The device further includes an armature disposed on a second side of the coupling disc opposite the conductor. The coupling disc, the electromagnet assembly and the armature form an electromagnetic circuit when current is supplied to the conductor to urge the armature towards engagement with the coupling disc. The device further includes an anti-rotation mechanism for the electromagnet assembly. The mechanism includes at least one coupling permanent magnet configured to be mounted to an outer surface of the housing of the electromagnet assembly and at least one fixed permanent magnet configured to be mounted to a fixed support structure. The at least one coupling permanent magnet and the at least one fixed permanent magnet are arranged to inhibit movement of the at least one coupling permanent magnet and the electromagnet assembly in either rotational direction about the rotational axis.

A rotational coupling device in accordance with another embodiment of the present teachings includes a coupling disc configured to be disposed about a shaft having a rotational axis. The device further includes an electromagnet assembly disposed on a first side of the coupling disc. The assembly includes a housing and a conductor disposed within the housing. The device further includes an armature disposed on a second side of the coupling disc opposite the conductor. The coupling disc, the electromagnet assembly and the armature form an electromagnetic circuit when current is supplied to the conductor to urge the armature towards engagement with the coupling disc. The device further includes an anti-rotation mechanism for the electromagnet assembly. The mechanism includes at least one coupling permanent magnet configured to be mounted to an outer surface of the housing of the electromagnet assembly and aligned with at least one fixed permanent magnet mounted to a fixed support structure so as to inhibit movement of the at least one coupling permanent magnet and the electromagnet assembly in either rotational direction about the rotational axis.

A rotational coupling device in accordance with another embodiment of the present teachings includes a coupling disc configured to be disposed about a shaft having a rotational axis. The device further includes an electromagnet assembly disposed on a first side of the coupling disc. The assembly includes a housing and a conductor disposed within the housing. The device further includes an armature disposed on a second side of the coupling disc opposite the conductor. The coupling disc, the electromagnet assembly and the armature form an electromagnetic circuit when current is supplied to the conductor to urge the armature towards engagement with the coupling disc. The device further includes means for inhibiting rotation of the electromagnet assembly in either rotational direction about the rotational axis.

A rotational coupling device in accordance with the present teachings is advantageous relative to conventional coupling devices. In particular, the electromagnet assembly is fixed against rotation using aligned magnets on the electromagnet assembly and a fixed structure as opposed to a mechanical coupling between the electromagnet assembly and fixed structure. As a result, audible noise, mechanical stress and wear that occur during mechanical engagement of the electromagnet assembly and fixed structure in conventional rotational coupling devices may be reduced or eliminated.

The foregoing and other aspects, features, details, utilities, and advantages of the invention will be apparent from reading the following detailed description and claims, and from reviewing the accompanying drawings illustrating features of this invention by way of example.

DETAILED DESCRIPTION OF THE INVENTION

Figure 1:
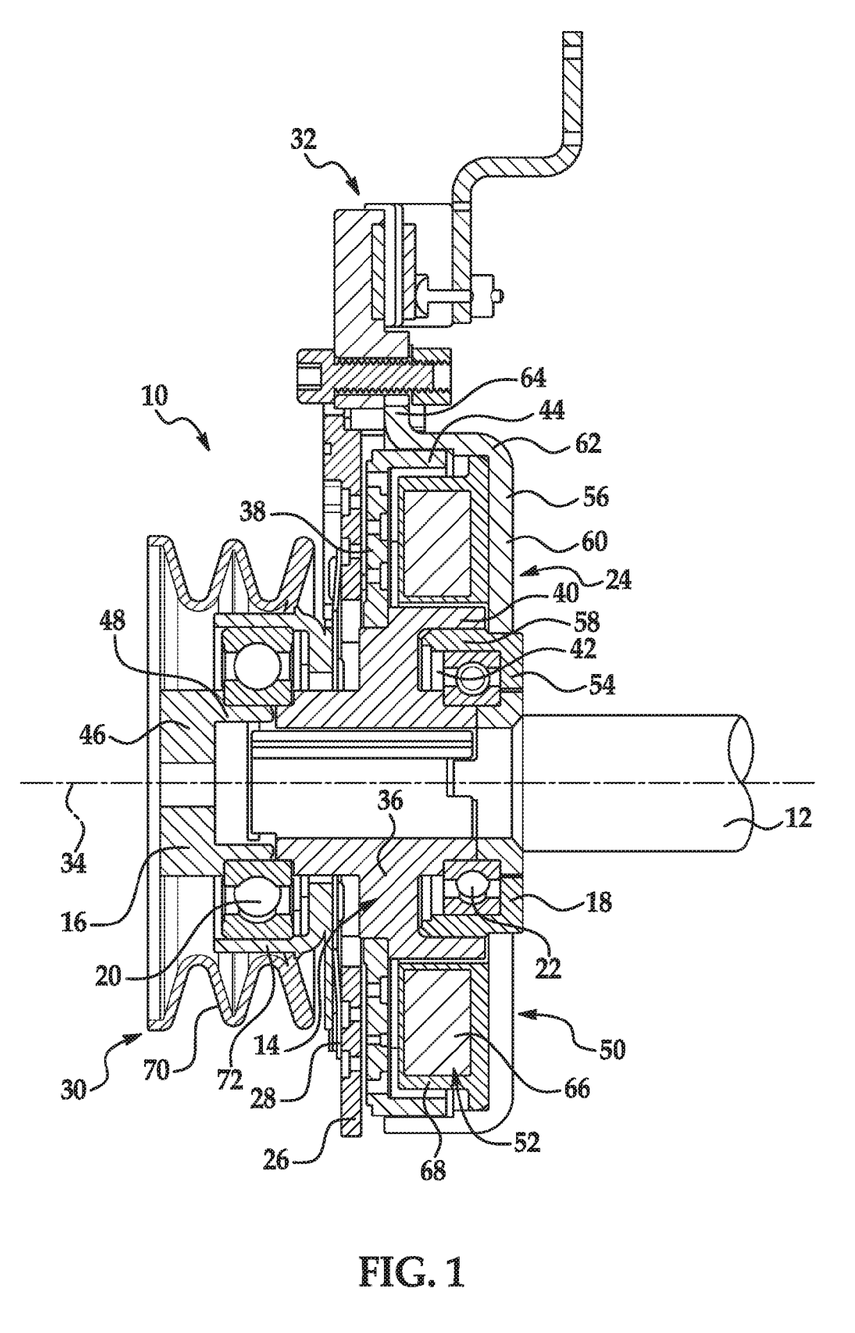
FIG. 1 is a cross-sectional drawing of a rotational coupling device in accordance with one embodiment of the present teachings.

Referring now to the drawings wherein like reference numerals are used to identify identical components in the various views, FIG. 1 illustrates a rotational coupling device 10 in accordance with one embodiment of the present invention. Device 10 functions as a clutch to selectively transfer torque between a shaft 12 and another device (not shown). Device 10 also functions as a brake when torque is not being transferred. Device 10 may be provided for use in a riding lawnmower or similar device. It will be understood by those of ordinary skill in the art, however, that device 10 may be used in a wide variety of applications requiring a clutch and/or brake. Device 10 may include a rotor 14, spacers 16, 18, bearings 20, 22, an electromagnet assembly 24, an armature 26, springs 28, and a torque transmission member 30. In accordance with the present teachings, coupling 10 further includes an anti-rotation mechanism 32 for electromagnet assembly 24.

Shaft 12 may function as an input shaft—delivering torque from a device (not shown) from which shaft 12 extends through coupling device 10 to another device (not shown). Alternatively, shaft 12 may function as an output shaft—receiving torque through coupling device 10 from another device (not shown) and transferring that torque to a device (not shown) from which shaft 12 extends. Shaft 12 may be made from conventional metals and metal alloys and may be solid or tubular. Shaft 12 is centered about a rotational axis 34 and may be driven by an engine, electric motor or other conventional power source when functioning as an input shaft. In the illustrated embodiment shaft 12 is inserted into device 10 on the opposite side of device 10 as torque transmission member 30 ("standard mount"). It should be understood, however, that the orientation of shaft 12 and spacer 16 could be reversed such that shaft 12 is inserted into device 10 on the same side as torque transmission member 30 ("reverse mount").

Rotor 14 is provided for selective engagement with armature 26 to transmit torque between shaft 12 and member 30. Rotor 14 is disposed about axis 34 and is coupled to shaft 12 for rotation therewith. Rotor 14 may be made from conventional metals and metal alloys and includes a hub 36 and a rotor or coupling disc 38.

Hub 36 is tubular and defines a central bore into which shaft 12 extends. Hub 36 may define an axially extending keyway (not shown) shaped complementary to, and configured to receive, a key (not shown) in shaft 12. Alternatively, hub 36 may be shaped with an integral, radially extending key configured to be received within a keyway in shaft 12. At either axial end, hub 36 defines shoulders that abut against and support bearings 20, 22. Further, hub 36 may define one or more notches or lugs disposed in either axial end face of hub 36 configured to engage corresponding notches or lugs in spacers 16, 18 as described in greater detail in U.S. Pat. No. 7,527,134, the entire disclosure of which is incorporated herein by reference. At its radially outer diameter, hub 36 defines an axially extending inner rotor pole 40. Hub 36 further defines an axially extending recess 42 radially inwardly of pole 40 for a purpose described hereinbelow.

Disc 38 extends radially outwardly from hub 36 and defines a clutch engagement surface facing armature 26. Disc 38 is coupled to hub 36 through, for example, a press-fit relationship including a plurality of complementary lugs and notches. As is known in the art, disc 38 may include a plurality of radially spaced rows of angularly spaced, banana shaped slots (not shown). Upon energization of electromagnet assembly 24, the slots cause magnetic flux to travel back and forth between disc 38 and armature 26 across an air gap enabling a high torque engagement between rotor 14 and armature 26. At its outer diameter, disc 38 defines an axially extending outer rotor pole 44. Pole 44 is radially aligned with pole 40 and spaced radially outwardly of pole 40.

Spacer 16 is provided to support bearing 20 and torque transmission member 30 in assembled relation with the other components of device 10 and may be made from conventional materials including powdered metals. Spacer 16 may have a lower magnetic permeability than rotor 14, electromagnet assembly 24 and armature 26 and may be made from, for example, non-ferromagnetic materials. Spacer 16 is disposed about axis 34 and is generally cylindrical in shape. Spacer 16 is configured to receive a fastener (not shown) that extends through spacer 16 and into shaft 12. Like spacer 16, the fastener may have a lower magnetic permeability than rotor 14, electromagnet assembly 24 and armature 26 and may be made from, for example, non-ferromagnetic materials such as certain stainless steels. Spacer 16 may define a head 46 at one axial end having a plurality of flats that allow spacer 16 to be secured while applying torque to the fastener. Spacer 16 may further define a body 48 extending axially from head 46. Body 48 has a generally cylindrical outer surface on which bearing 20 may be supported between opposed shoulders defined in rotor hub 36 and spacer 16. Spacer 16 may further define one or more axially projecting lugs or notches in an axial end face of body 48 configured to be received within or receive, respectively, corresponding notches or lugs in an axial end face in rotor hub 36 to rotatably couple spacer 16 and rotor hub 36.

Spacer 18 is provided to support bearing 22 and electromagnet assembly 24 in assembled relation with the other components of device 10 and may be made from conventional materials including powdered metals. Spacer 18 may have a lower magnetic permeability than rotor 14, electromagnet assembly 24 and armature 26 and may be made from, for example, non-ferromagnetic materials such as certain stainless steels. Spacer 18 is disposed about axis 34 and is generally cylindrical in shape. An inner diameter of spacer 18 is sized to receive shaft 12. An outer diameter of spacer 18 varies to define a shoulder configured to abut bearing 22 such that bearing 22 is disposed between opposed shoulders defined in rotor hub 36 and spacer 18. Spacer 18 may further define one or more axially projecting lugs or notches in an axial end face of spacer 18 configured to be received within or receive, respectively, corresponding notches or lugs in an axial end face of rotor hub 36 to rotatably couple spacer 18 and rotor hub 36.

Bearing 20 is provided to allow rotation of torque transmission member 30 relative to input shaft 12, rotor 14 and spacer 16. Bearing 20 is conventional in the art. An inner race of bearing 20 is supported on spacer 16 and rotor hub 36 and abuts opposed shoulders defined in spacer 16 and rotor hub 36. An outer race of bearing 20 supports torque transmission member 30.

Bearing 22 is provided to allow rotation of rotor hub 36 and spacer 18 relative to electromagnet assembly 24. Bearing 22 is conventional in the art. An inner race of bearing 22 is supported on spacer 18 and rotor hub 36 and abuts opposed shoulders defined in spacer 18 and rotor hub 36. An outer race of bearing 22 supports electromagnet assembly 24.

Electromagnet assembly 24 creates a electromagnetic circuit among rotor 14, portions of assembly 24, and armature 26 to cause movement of armature 26 into engagement with rotor 14 and transmission of torque between shaft 12 and torque transmission member 30. Assembly 24 is disposed on one side of coupling disc 36 and includes a field shell or housing 50 and a conduction assembly 52.

Housing 50 is provided to house conduction assembly 52. Housing 50 also forms part of a magnetic circuit that causes the selective engagement of rotor 14 and armature 26. Housing 50 may be made from conventional metals and metal alloys, including steel. Housing 50 is cylindrical and is disposed about axis 34 and is supported on an outer race of bearing 22. As described in greater detail below, housing 50 is fixed against rotation. Housing 50 is generally U-shaped in cross-section and includes radially inner and radially outer annular members 54, 56.

Inner member 54 is supported on an outer race of bearing 22. Member 54 is generally L-shaped in cross-section and defines an axially extending inner pole 58. Pole 58 extends into recess 42 of hub 36 of rotor 14 and is therefore disposed radially inwardly of inner rotor pole 40. As described more fully in commonly assigned U.S. Pat. No. 7,493,996, the entire disclosure of which is incorporated herein by reference, the relative location of poles 40, 58 is advantageous for several reasons. First, the magnetic efficiency of the magnetic circuit involving rotor 14, armature 26 and housing 50 is improved by reducing the number of air gaps for at least some of the magnetic flux in the circuit. Second, the annular gap in which conduction assembly 52 is disposed is enlarged enabling easier insertion and fastening of assembly 52 within housing 50.

Outer member 56 is coupled to and supported on inner member 54. Outer member 56 defines an end wall 60, an axially extending outer pole 62, and a flange 64. End wall 60 extends radially outwardly from member 54. Pole 62 is integral with, and extends axially from, end wall 60. Pole 62 is disposed radially outwardly of pole 44 of rotor 14. Flange 64 is integral with, and extends radially outwardly from, pole 62 at an end of pole 62 opposite end wall 60. Flange 64 extends along at least a portion of the circumference of pole 62.

Conduction assembly 52 is provided to create a magnetic circuit among rotor 14, armature 26 and housing 50 to cause movement of armature 26 into engagement with rotor 14 and transmission of torque between shaft 12 and torque transmission member 30. Conduction assembly 52 is generally annular and is disposed about axis 34 within housing 50. In particular, assembly 52 is disposed between the inner and outer poles 58, 62 of housing 50. Assembly 52 includes a conductor 66 and a conductor shell 68.

Conductor 66 may comprise a conventional copper coil although other known conductors may alternatively be used. Conductor 66 may be connected electrically to a power supply (not shown) such as a battery. Upon energization of conductor 66, an electromagnetic circuit is formed between rotor 14, armature 26 and housing 50. Magnetic flux flows from outer pole 62 of housing 50 across an air gap to outer pole 44 of rotor 14. Flux then travels back and forth between disc 38 and armature 26 across the air gap between them. Flux then flows from disc 38 of rotor 14 to hub 36 of rotor 14. Finally, flux flows from hub 36 back to members 54, 56 of housing 50 along several paths. In particular, a portion of the flux flows directly from inner rotor pole 40 to outer member 56 of housing 50. Another portion of the flux flows from hub 36 through inner pole 58 of housing 50 defined by inner member 54 before flowing to outer member 56. Still another portion of the flux may flow from hub 36 to spacer 18 (at least in those embodiments wherein spacer 18 is not made from a material having a lower magnetic permeability than structures along alternate paths) radially inwardly of bearing 22 and then to inner member 54 and outer member 56 allowing a portion of the flux to avoid the high density area of inner rotor pole 40 and inner housing pole 58 and further improving the magnetic efficiency of the circuit.

Conductor shell 68 is provided to house conductor 66 and is also used to mount conductor 66 within housing 50. Shell 68 may be molded from conventional plastics. Shell 68 may include an integral terminal connector (not shown) through which conductor 66 may be electrically connected to a power source. Shell 68 may also define one or more lugs sized to be received within recesses in end wall 60 of member 56 of housing 50 to prevent rotation of conduction assembly 52. Shell 68 may include a radially outwardly extending flange disposed proximate outer pole 62 of housing 50 and affixed to member 56 of housing 50 at a plurality of points as described in commonly assigned pending U.S. Pat. No. 7,975,818, the entire disclosure of which is incorporated herein by reference.

Armature 26 is provided to transmit torque between rotor 14 and torque transmission member 30. Armature 26 may be made from a variety of conventional metals and metal alloys including steel. Armature 26 is annular in construction and disposed about axis 34. Armature 26 is disposed on one side of coupling disc 36 opposite electromagnet assembly 24 and defines a clutch engagement surface facing coupling disc 38. Armature 26 is axially spaced from coupling disc 38 by an air gap. Like coupling disc 38, armature 26 may include a plurality of radially spaced rows of angularly spaced slots (not shown) that facilitate travel of magnetic flux back and forth between rotor 14 and armature 26 upon energization of conduction assembly 52. Armature 26 is coupled to transmission member 30. In particular, armature 26 may be coupled to torque transmission member 30 by a plurality of leaf springs 28.

Springs 28 transmit drive and braking torque from armature 26 to torque transmission member 30 and allow for axial movement of armature 26 relative to member 30 and towards and away from coupling disc 38. Springs 28 may be made from stainless steel and are connected at one end to armature 26 and at an opposite end to member 30 using conventional fasteners such as rivets, screws, bolts, or pins.

Torque transmission member 30 transfers torque between shaft 12 and another device such as a lawnmower blade. Member 30 may include a conventional pulley 70 around which a torque transmitting belt is wound and coupled to the device. Member 30 further includes a support cup 72 on which pulley 70 is supported and from which pulley 70 extends radially outwardly. Cup 72 includes an axially extending portion supported on an outer race of bearing 20 and a radially extending flange to which one end of each spring 28 is coupled using conventional fasteners.

Figure 2:
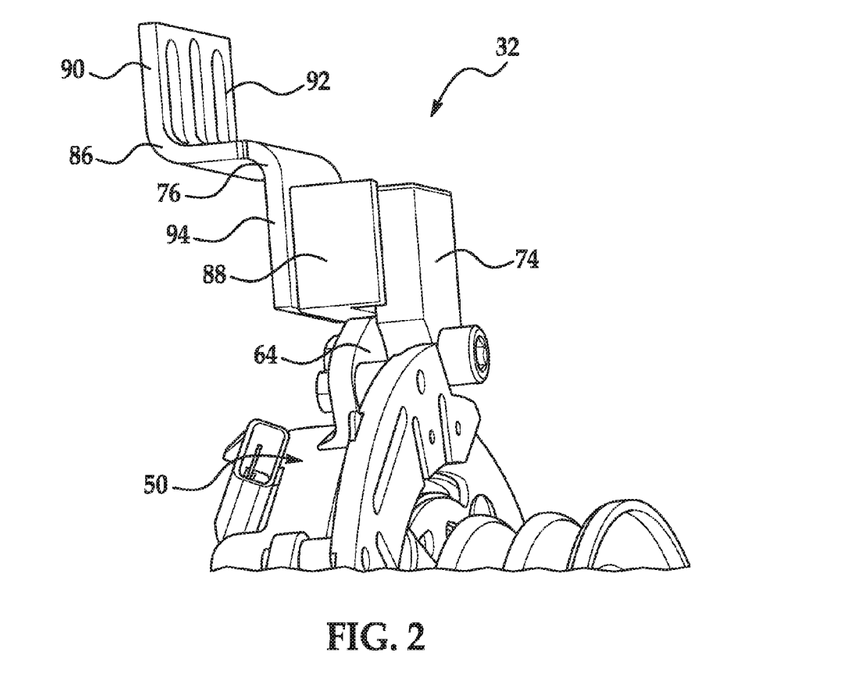
FIG. 2 is a perspective view of a portion of the rotational coupling device of FIG. 1 showing one embodiment of an anti-rotation mechanism for the coupling device.
Figure 3:
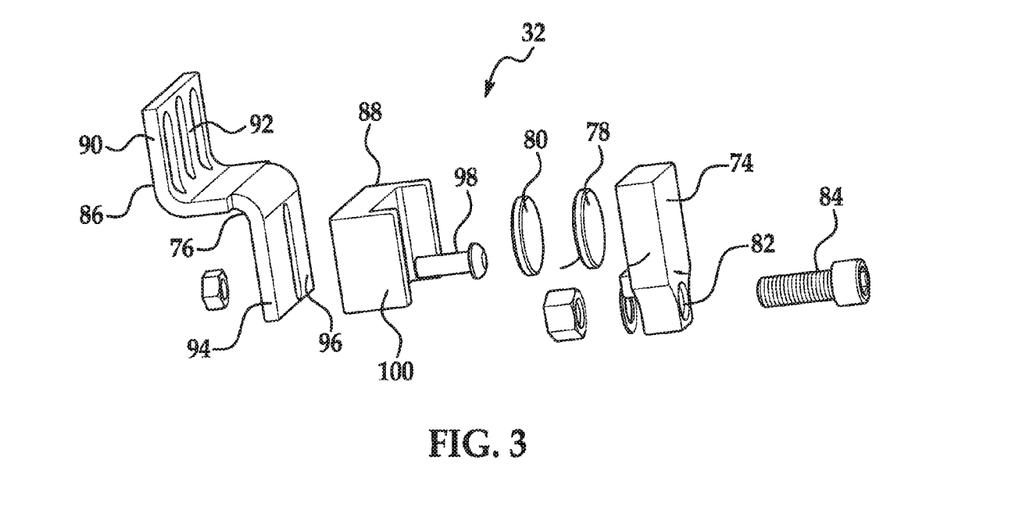
FIG. 3 is an exploded perspective view of the anti-rotation mechanism shown in FIG. 2.

Referring to FIGS. 2-3, anti-rotation mechanism 32 provides a means for inhibiting rotation of electromagnet assembly 24 in either rotational direction about axis 34 without mechanically coupling assembly 24 to a fixed structure. Assembly 24 may include mounting brackets 74, 76 and permanent magnets 78, 80.

Brackets 74, 76 provide means for mounting magnets 78, 80 and orienting magnets 78, 80 relative to one another. Brackets 74, 76 may be made from non-ferromagnetic materials or other materials having a relatively low magnetic permeability. Bracket 74 is affixed to housing 50 of assembly 24. In the illustrated embodiment, bracket 74 defines a bore 82 configure to align with a corresponding bore in flange 64 of outer member 56 of housing 50 and to receive a fastener 84 such as a screw extending through the bores. Bracket 76 is configured to be mounted to a fixed support structure (not shown). The nature of the fixed support structure will vary depending on the application in which device 10 is used. In one embodiment, the fixed support structure may comprise a frame for a lawnmower. It should be understood that the term "fixed support structure" refers to a structure that is fixed against rotation relative to axis 34 and does not mean that the structure is incapable of movement generally. In the illustrated embodiment, bracket 76 includes two members 86, 88. Member 86 is generally S-shaped in cross-section. One end 90 of member 86 is configured for coupling to the fixed support structure and may include a plurality of slots 92 that facilitate alignment of bracket 76 with the fixed support structure and through which one or more fasteners (not shown) may extend to couple bracket 76 to the fixed support structure. The other end 94 of member 86 is configured for coupling to member 88 and may include one or more slots 96 that facilitate alignment of members, 86, 88 and through which one or more fasteners 98 may extend to couple members 86, 88. Member 88 is substantially rectilinear in shape in the illustrated embodiment with flanges 100 extending axially from either circumferential side of member 88 and between which magnets 78, 80 and bracket 74 may be received upon assembly. Bracket 74 and member 88 of bracket 76 may each define recesses configured to receive magnets 78, 80 therein. Flanges 100 on bracket 88 prevent movement of housing 50 of electromagnet assembly 24 relative to the fixed support structure in the event that the magnetic force of magnets 78, 80 is insufficient. It should be understood, that the configuration of brackets 74, 76 may vary depending on the application as needed in order to couple brackets 74, 76 to the housing 50 of electromagnet assembly 24 and the fixed support structure, respectively, and as needed to properly orient magnets 78, 80.

Magnets 78, 80 establish attractive and/or repellant forces to position housing 50 of electromagnet assembly 24 relative to the fixed support structure and thereby prevent rotation of housing 50. Magnet 78 is configured to be mounted, through bracket 74, to an outer surface of housing 50 of electromagnet assembly 24 while magnet 80 is configured to be mounted, through bracket 76, to a fixed support structure. Magnets 78, 80 may comprise neodymium iron boron (Nd—Fe—B) magnets or other known permanent magnets. Magnets 78, 80 may comprise self-aligning magnets (e.g., of the type offered for sale under the trademark "POLYMAGNET" by Correlated Magnetics Research LLC of Huntsville, Ala.) having various areas of defined polarity such that magnets 78, 80 are configured to align in a one or more specific orientations. In the illustrated embodiment, magnets 78, 80 may each define a plurality of poles with the poles of magnet 78 facing poles of opposite polarity in magnet 80. In the illustrated embodiment, magnets 78, 80 are circular in shape, but it should be understood that the shape of magnets 78, 80 may vary. Magnets 78, 80 may be coupled to brackets 74, 76 by bonding magnets 78, 80 to brackets 74, 76, clamping magnets 78, 80 to brackets 74, 76 or by potting. A cover made from polymers or another non-magnetic material may be disposed over magnet 78 and/or magnet 80 and reside between magnets 78, 80 to prevent physical contact between magnets 78, 80 and establish the air gap between magnets 78, 80.

Figure 4:
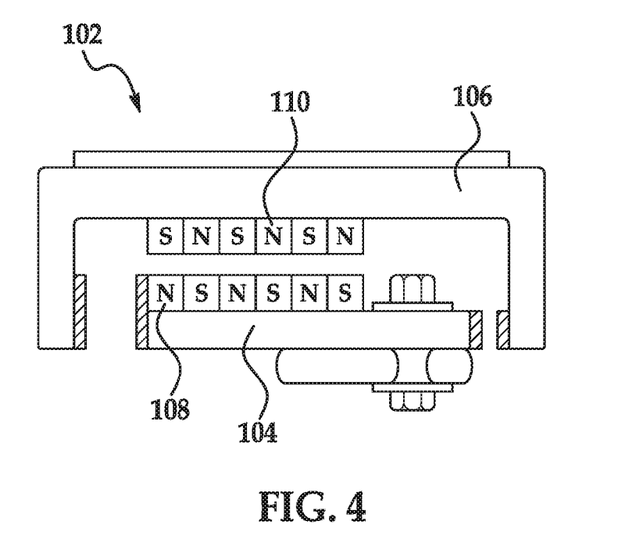
FIG. 4 is a schematic view of another embodiment of an anti-rotation mechanism for the coupling device of FIG. 1.

Referring now to FIG. 4, an anti-rotation mechanism 102 in accordance with another embodiment of the present teachings is shown. Mechanism 102 provides another means for inhibiting rotation of electromagnet assembly 24 in either rotational direction about axis 34 without mechanically coupling assembly 24 to a fixed structure. Mechanism 102 includes mounting brackets 104, 106, which may be similar to brackets 74, 76 described above, and magnets 108, 110 coupled to brackets 104, 106, respectively. Magnet 108 is configured to be mounted, through bracket 104, to an outer surface of housing 50 of electromagnet assembly 24 while magnet 110 is configured to be mounted, through bracket 106, to a fixed support structure. Magnets 108, 110 may again comprise neodymium iron boron (Nd—Fe—B) magnets or other known permanent magnets. Magnets 108, 110 may also again comprise self-aligning magnets. In the illustrated embodiment, magnets 108, 110 each define six poles that alternate moving in a circumferential direction. Each pole on magnet 108 is axially spaced from, and tends to align with, a pole of magnet 110 having the opposite polarity. In this manner, housing 50, to which bracket 104 and magnet 108 are coupled, is inhibited from moving in either circumferential direction about axis 34. It should be understood that magnets 108, 110 may comprise unitary structures with a plurality of defined poles of each of two opposite polarities (e.g., at least two South poles and at least two North poles) or may be formed from multiple magnets coupled together and that each having a single defined pole of each of two opposite polarities.

Figure 5:
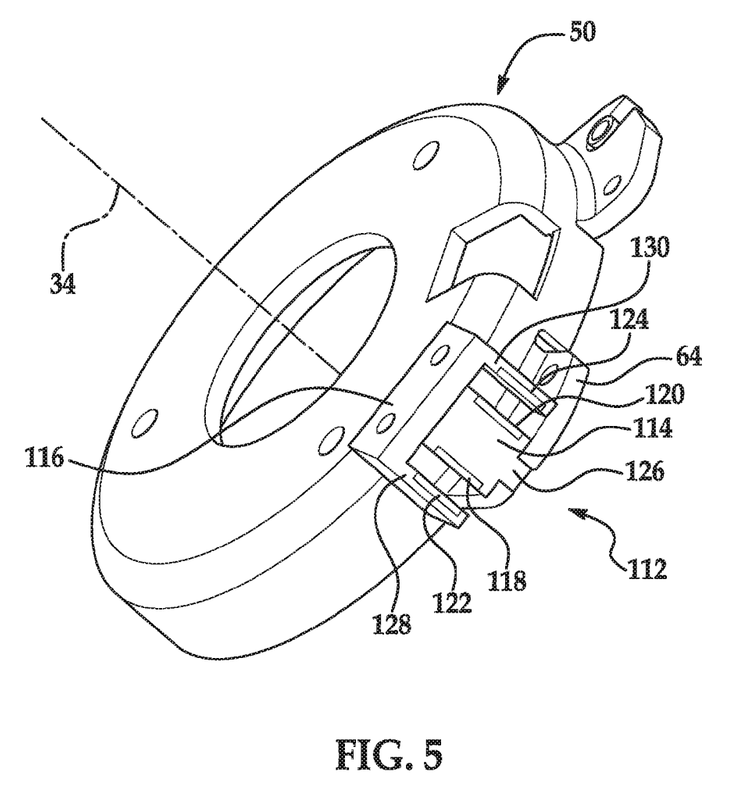
FIG. 5 is a perspective view of another embodiment of an anti-rotation mechanism for the coupling device of FIG. 1.
Figure 6:
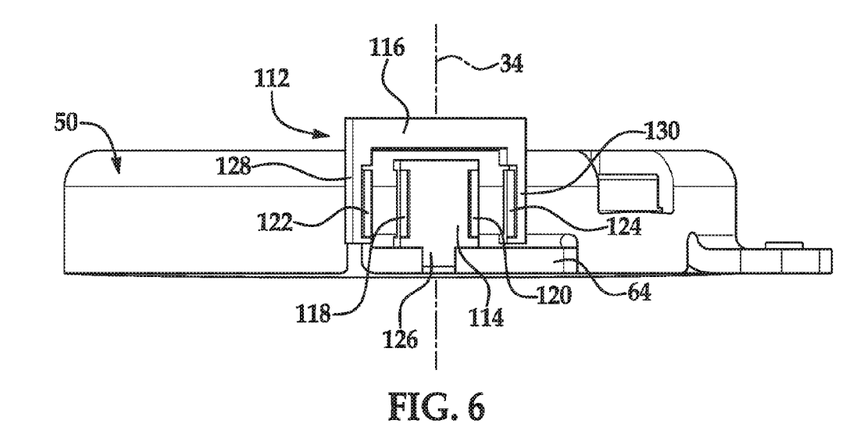
FIG. 6 is a plan view of the anti-rotation mechanism of FIG. 5.

Referring now to FIGS. 5-6, an anti-rotation mechanism 112 in accordance with another embodiment of the present teachings is shown. Mechanism 112 provides another means for inhibiting rotation of electromagnet assembly 24 in either rotational direction about axis 34 without mechanically coupling assembly 24 to a fixed structure. Mechanism 112 includes mounting brackets 114, 116 affixed to housing 50 and a fixed support structure (not shown) and magnets 118, 120, 122, 124. Brackets 114, 116 may be made from non-ferromagnetic materials. Bracket 114 is substantially rectangular in shape, but may define a lug 126 at one axial end configured to be received within a corresponding notch in flange 64 of outer member 56 of housing 50. Bracket 114 further defines a recess on either circumferential side configured to received magnets 118, 120. The depth of the recesses may be greater than the depth of the corresponding magnets 118, 120 such that the magnets 118, 120 are not flush with the circumferential surfaces of bracket 114. Covers may enclose the magnets 118, 120 within the recesses. The covers may be made from an elastomeric material. Bracket 116 is substantially C-shaped in cross-section with circumferentially spaced arms 128, 130 configured to be disposed on either circumferential side of bracket 114. Arms 128, 130 are configured to mount magnets 122, 124 and may define recesses configured to receive magnets 122, 124. The depth of the recesses may again be greater than the depth of the corresponding magnets 122, 124 such that the magnets 122, 124 are not flush with the inner circumferential surfaces of arms 128, 130. Elastomeric covers may again enclose magnets 122, 124 within the recesses. Magnets 118, 120 are configured to be mounted, through bracket 114, to an outer surface of housing 50 of electromagnet assembly 24 while magnets 122, 124 are configured to be mounted, through bracket 116, to a fixed support structure. Magnets 118, 120, 122, 124 may again comprise neodymium iron boron (Nd—Fe—B) magnets or other known permanent magnets and may be formed by injection molding or sintering. Magnets 118, 120, 122, 124 are arranged such that magnets 118, 120 are disposed circumferentially between magnets 122, 124 relative to axis 34. Magnets 118, 122 are aligned with one another and are circumferentially spaced from one another and magnets 120, 124 likewise are aligned with one another and are circumferentially spaced from one another. Magnets 118, 122 define poles facing one another and having the same polarity. Likewise, magnets 120, 124 define poles facing one another and having the same polarity. As a result, bracket 114 is urged away from either arm 128, 130 of bracket 116 towards a central position between arms 128, 130 and is fixed against rotation relative to axis 34.

Figure 7:
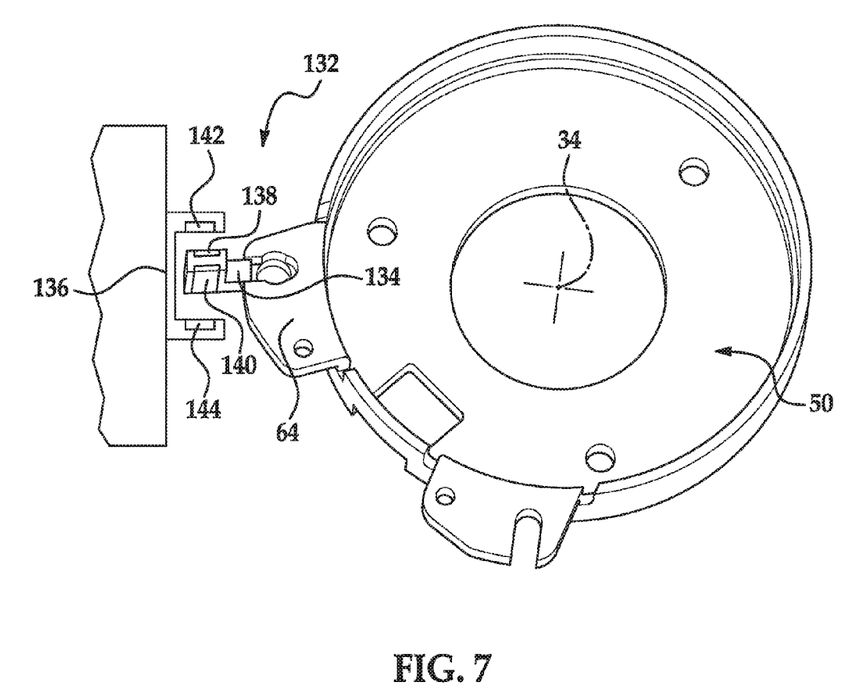
FIG. 7 is a perspective view of another embodiment of an anti-rotation mechanism for the coupling device of FIG. 1.

Referring now to FIG. 7, an anti-rotation mechanism 132 in accordance with another embodiment of the present teachings is shown. Mechanism 132 provides another means for inhibiting rotation of electromagnet assembly 24 in either rotational direction about axis 34 without mechanically coupling assembly 24 to a fixed structure. Mechanism 132 includes mounting brackets 134, 136 affixed to housing 50 and a fixed support structure as well as magnets 138, 140, 142, 144. Brackets 134, 136 and magnets 138, 140, 142, 144 may be substantially similar to brackets 114, 116 and magnets 118, 120, 122, 124 in mechanism 112 discussed above. Brackets 134, 136 are configured, however, to locate magnets 118, 120, 122, 124 further outward radially from axis 34 relative to mechanism 112. Referring again to FIGS. 5-6, bracket 114 projects axially from flange 64 of housing 50 and locates magnets 118, 120, 122, 124 radially outward of pole 62 of housing 50 at a first radial distance from axis 34. Referring to FIG. 7, bracket 134 projects radially from flange 64 of housing 50 such that magnets 138, 140, 142, 144 are located beyond the radially outer periphery of housing 50 at a second, and greater, radial distance from axis 34. The increased radial distance results in an increase in anti-rotational force due to the increase in the moment arm relative to axis 34. Magnets 138, 140, 142, 144 may also be axially spaced from housing 50 relative to axis 34 depending on the configuration of brackets 134, 136.

Figure 8:
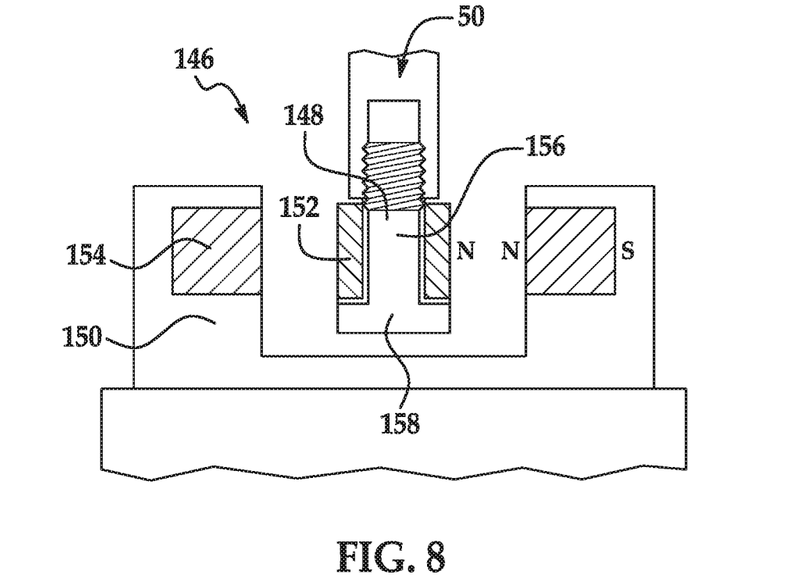
FIG. 8 is a schematic view of another embodiment of an anti-rotation mechanism for the coupling device of FIG. 1.
Figure 9:
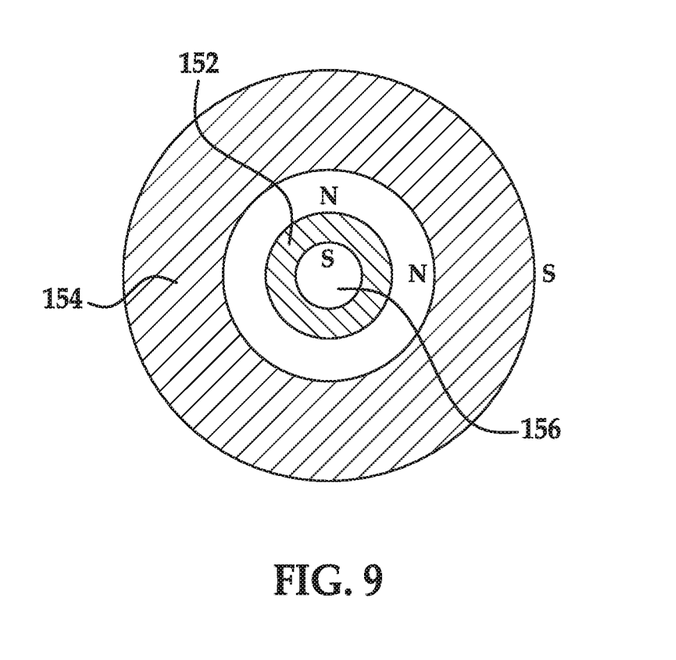
FIG. 9 is a cross-sectional view of a portion of the anti-rotation mechanism shown in FIG. 8.

Referring now to FIGS. 8-9, an anti-rotation mechanism 146 in accordance with another embodiment of the present teachings is shown. Mechanism 146 provides another means for inhibiting rotation of electromagnet assembly 24 in either rotational direction about axis 34 without mechanically coupling assembly 24 to a fixed structure. Mechanism 146 includes mounting brackets 148, 150 affixed to housing 50 and a fixed support structure as well as magnets 152, 154. Brackets 148, 150 may be substantially circular in shape. Bracket 148 defines portions 156, 158 of varying diameter. Portion 156 may be configured to receive magnet 152 thereon and may be further configured to be received within a corresponding recess in flange 64 of housing 50. A part of portion 156 may include splines, threads or other formations intended to engage corresponding formations in housing 50 to secure bracket 148 to housing 50. Portion 158 may define a shoulder configured to retain magnet 152 on bracket 148. Bracket 150 may be annular in shape and define a circular groove in a radially inner surface configured to receive magnet 154. Magnet 152 is configured to be mounted, through bracket 148, to an outer surface of housing 50 of electromagnet assembly 24 while magnet 154 is configured to be mounted, through bracket 150, to a fixed support structure. Magnets 152, 154 are annular in shape and, upon assembly, magnet 154 is configured to surround magnet 152. It should be understood, however, that brackets 148, 150 and magnets 152, 154 could be configured such that magnet 152 surrounds magnet 154. A pole formed on a radially outer surface of magnet 152 and a pole formed on a radially inner surface of magnet 154 may have the same polarity. As a result, magnet 152 is urged to a central, concentric position with magnet 154 and inhibited from movement relative to magnet 154 thereby inhibiting movement of housing 50 and electromagnet assembly 24.

A rotational coupling device 10 in accordance with the present teachings is advantageous relative to conventional coupling devices. In particular, the electromagnet assembly 24 is fixed against rotation using aligned magnets 78, 80 or 108, 110 or 118, 120, 122, 124 or 138, 140, 142, 144 or 152, 154 on the electromagnet assembly 24 and a fixed structure as opposed to a mechanical coupling between the electromagnet assembly 24 and fixed structure. As a result, audible noise, mechanical stress and wear that occur during mechanical engagement of the electromagnet assembly and fixed structure in conventional rotational coupling devices may be reduced or eliminated.

While the invention has been shown and described with reference to one or more particular embodiments thereof, it will be understood by those of skill in the art that various changes and modifications can be made without departing from the spirit and scope of the invention.

What is claimed is:

1. A rotational coupling device, comprising:
   a coupling disc configured to be disposed about a shaft having a rotational axis;
   an electromagnet assembly disposed on a first side of the coupling disc, the assembly including
      a housing; and
      a conductor disposed within the housing
   an armature disposed on a second side of the coupling disc opposite the conductor, the coupling disc, the electromagnet assembly and the armature forming an electromagnetic circuit when current is supplied to the conductor to urge the armature towards engagement with the coupling disc; and,
   an anti-rotation mechanism for the electromagnet assembly including
      at least one coupling permanent magnet configured to be mounted to an outer surface of the housing of the electromagnet assembly; and,
      at least one fixed permanent magnet configured to be mounted to a fixed support structure
      wherein the at least one coupling permanent magnet and the at least one fixed permanent magnet are arranged to inhibit movement of the at least one coupling permanent magnet and the electromagnet assembly in either rotational direction about the rotational axis.

2. The rotational coupling device of claim 1 wherein the at least one coupling permanent magnet comprises first and second coupling permanent magnets and the at least one fixed permanent magnet comprises first and second fixed permanent magnets, the first coupling permanent magnet aligned with and circumferentially spaced from the first fixed permanent magnet relative to the rotational axis and the second coupling permanent magnet aligned with and circumferentially spaced from the second fixed permanent magnet relative to the rotational axis.

3. The rotational coupling device of claim 2 wherein the first and second coupling permanent magnets are disposed between the first and second fixed permanent magnets in a circumferential direction relative to the rotational axis.

4. The rotational coupling device of claim 1 wherein a first pole of the at least one coupling permanent magnet and a first pole of the at least one fixed permanent magnet facing the first pole of the at least one coupling permanent magnet have the same polarity.

5. The rotational coupling device of claim 1 wherein the at least one coupling permanent magnet comprises first and second coupling permanent magnets and the at least one fixed permanent magnet comprises first and second fixed permanent magnets, the first coupling permanent magnet aligned with and axially spaced from the first fixed permanent magnet relative to the rotational axis and the second coupling permanent magnet aligned with and axially spaced from the second fixed permanent magnet relative to the rotational axis.

6. The rotational coupling device of claim 1 wherein a first pole of the at least one coupling permanent magnet and a first pole of the at least one fixed permanent magnet facing the first pole of the at least one coupling permanent magnet have opposite polarities.

7. The rotational coupling device of claim 1 wherein the anti-rotation mechanism further includes a first mounting bracket affixed to said housing and on which the at least one coupling permanent magnet is mounted.

8. The rotational coupling device of claim 7 wherein the first mounting bracket defines a recess configured to receive the at least one coupling permanent magnet, a depth of the recess greater than a depth of the at least one coupling permanent magnet.

9. The rotational coupling device of claim 8, further comprising an elastomeric cover enclosing the at least one coupling permanent magnet within the recess.

10. The rotational coupling device of claim 7, wherein the anti-rotation mechanism further includes a second mounting bracket configured to be mounted to the fixed support structure and on which the at least one fixed permanent magnet is mounted.

11. The rotational coupling device of claim 1 wherein the at least one coupling permanent magnet and the at least one fixed permanent magnet are circumferentially spaced relative to the rotational axis.

12. The rotational coupling device of claim 1 wherein the at least one coupling permanent magnet and the at least one fixed permanent magnet are axially spaced from the housing relative to the rotational axis.

13. The rotational coupling device of claim 1 wherein the at least one coupling permanent magnet and the at least one fixed permanent magnet are annular in shape and one of the at least one coupling permanent magnet and the at least one fixed permanent magnet is disposed concentrically within the other of the at least one coupling permanent magnet and the at least one fixed permanent magnet.

14. A rotational coupling device, comprising:
a coupling disc configured to be disposed about a shaft having a rotational axis;
an electromagnet assembly disposed on a first side of the coupling disc, the assembly including
a housing; and
a conductor disposed within the housing
an armature disposed on a second side of the coupling disc opposite the conductor, the coupling disc, the electromagnet assembly and the armature forming an electromagnetic circuit when current is supplied to the conductor to urge the armature towards engagement with the coupling disc; and,
an anti-rotation mechanism for the electromagnet assembly including
at least one coupling permanent magnet configured to be mounted to an outer surface of the housing of the electromagnet assembly and aligned with at least one fixed permanent magnet mounted to a fixed support structure so as to inhibit movement of the at least one coupling permanent magnet and the electromagnet assembly in either rotational direction about the rotational axis.

15. The rotational coupling device of claim 14 wherein the at least one coupling permanent magnet comprises first and second coupling permanent magnets and the at least one fixed permanent magnet comprises first and second fixed permanent magnets, the first coupling permanent magnet aligned with and circumferentially spaced from the first fixed permanent magnet relative to the rotational axis and the second coupling permanent magnet aligned with and circumferentially spaced from the second fixed permanent magnet relative to the rotational axis.

16. The rotational coupling device of claim 14 wherein the at least one coupling permanent magnet comprises first and second coupling permanent magnets and the at least one fixed permanent magnet comprises first and second fixed permanent magnets, the first coupling permanent magnet aligned with and axially spaced from the first fixed permanent magnet relative to the rotational axis and the second coupling permanent magnet aligned with and axially spaced from the second fixed permanent magnet relative to the rotational axis.

17. The rotational coupling device of claim 14 wherein the at least one coupling permanent magnet and the at least one fixed permanent magnet are circumferentially spaced relative to the rotational axis.

18. The rotational coupling device of claim 14 wherein the at least one coupling permanent magnet and the at least one fixed permanent magnet are axially spaced from the housing relative to the rotational axis.

19. The rotational coupling device of claim 14 wherein the at least one coupling permanent magnet and the at least one fixed permanent magnet are annular in shape and one of the at least one coupling permanent magnet and the at least one fixed permanent magnet is disposed concentrically within the other of the at least one coupling permanent magnet and the at least one fixed permanent magnet.

20. A rotational coupling device, comprising:
a coupling disc configured to be disposed about a shaft having a rotational axis;
an electromagnet assembly disposed on a first side of the coupling disc, the assembly including
a housing; and
a conductor disposed within the housing
an armature disposed on a second side of the coupling disc opposite the conductor, the coupling disc, the electromagnet assembly and the armature forming an electromagnetic circuit when current is supplied to the conductor to urge the armature towards engagement with the coupling disc; and, means for inhibiting rotation of the electromagnet assembly in either rotational direction about the rotational axis.

\* \* \* \* \*